United States Patent

Döbbeling et al.

[11] Patent Number: 5,937,632
[45] Date of Patent: Aug. 17, 1999

[54] METHOD FOR OPERATING A GAS TURBINE GROUP WITH CATALYTIC GAS GENERATOR

[75] Inventors: Klaus Döbbeling, Windisch; Timothy Griffin, Ennetbande, both of Switzerland

[73] Assignee: ABB Research Ltd., Zurich, Switzerland

[21] Appl. No.: 08/984,658

[22] Filed: Dec. 3, 1997

[30] Foreign Application Priority Data

Dec. 21, 1996 [DE] Germany ................ 196 54 022

[51] Int. Cl.⁶ .......................................... F02C 3/20
[52] U.S. Cl. ..................... 60/39.06; 60/39.12; 60/723
[58] Field of Search ................. 60/39.02, 39.06, 60/39.12, 39.463, 723, 737

[56] References Cited

U.S. PATENT DOCUMENTS

| | | | |
|---|---|---|---|
| 2,655,786 | 10/1953 | Carr | 60/39.02 |
| 3,167,913 | 2/1965 | Muhlberg et al. | 60/39.02 |
| 5,048,284 | 9/1991 | Lywood et al. | 60/39.02 |
| 5,729,967 | 3/1998 | Joos et al. | 60/39.12 |

FOREIGN PATENT DOCUMENTS

| | | |
|---|---|---|
| 4304213A1 | 8/1994 | Germany. |
| 19521356A1 | 12/1996 | Germany. |

*Primary Examiner*—Louis J. Casaregola
*Attorney, Agent, or Firm*—Burns, Doane, Swecker & Mathis, L.L.P.

[57] ABSTRACT

In the case of a method for operating a gas turbine group, the gas turbine group essentially consists of a compressor (1), a combustion chamber (5), a turbine (2) and a generator (3). Fuel is mixed in a premixer (18) of the combustion chamber (5), prior to the combustion, with air compressed in the compressor (1), and subsequently burned in a combustion space (19).

Compressed air, fed via an air line element (15), is mixed with fuel fed via a fuel line element (16) and delivered to a reactor (10) having a catalytic coating. The air/fuel mixture is converted in the reactor (10) into a synthesis gas comprising hydrogen, carbon monoxide, residual air and residual fuel and this synthesis gas is injected into the zones of the combustion chamber (5) where the flame is stabilized.

9 Claims, 1 Drawing Sheet

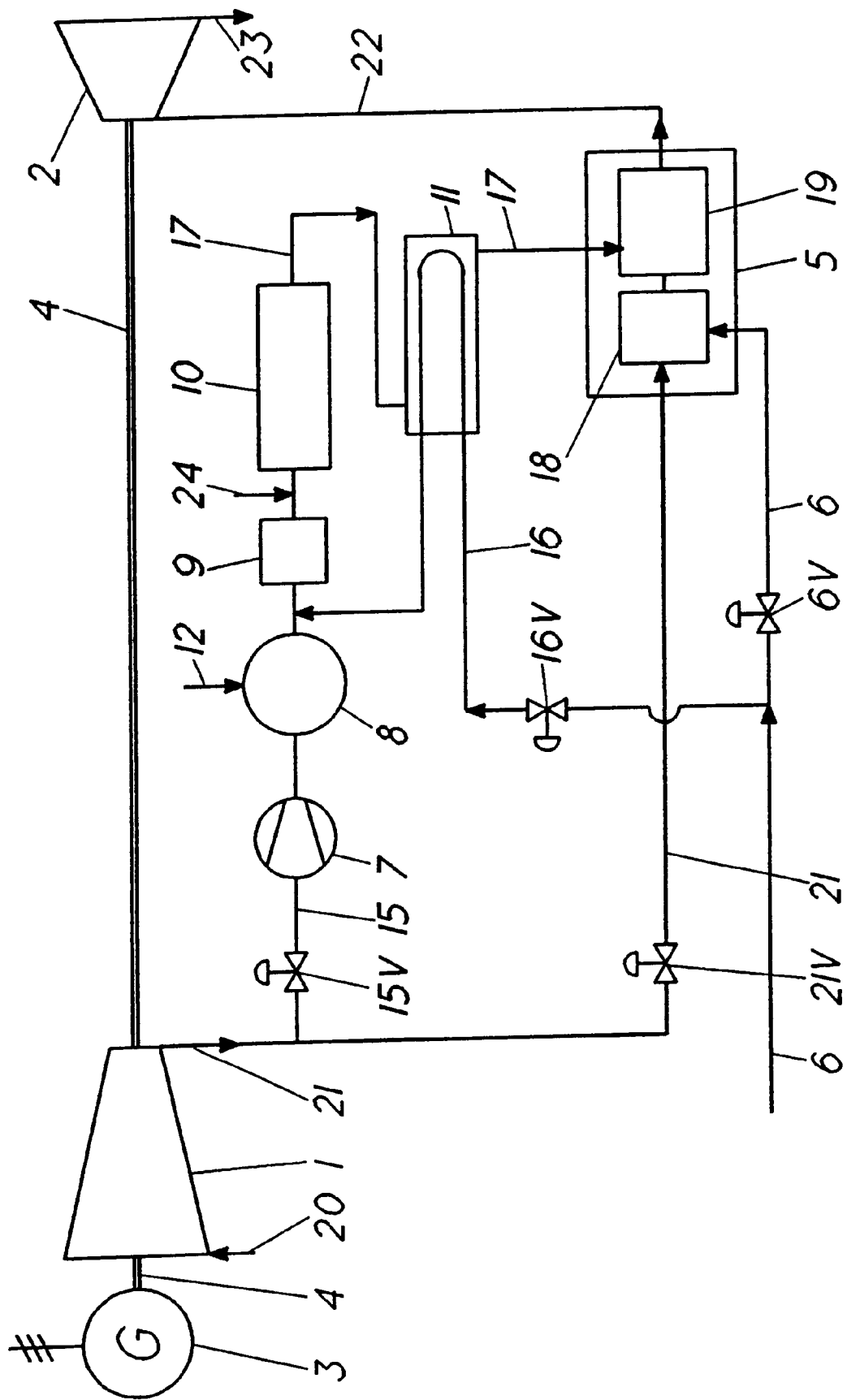

METHOD FOR OPERATING A GAS TURBINE GROUP WITH CATALYTIC GAS GENERATOR

BACKGROUND OF THE INVENTION

1. Field of the Invention

The invention is based on a method for operating a gas turbine group according to the preamble of the first claim.

2. Discussion of Background

In the combustion of lean air/fuel mixtures, they are burned close to their lean extinguishing limit in order to keep the flame temperature as low as possible. Nitrogen oxide emissions can in this way be minimized. In the partial load range, however, serious problems arise since the combustion temperature cannot be reduced simply by reducing the quantity of fuel, since this would lead to increased CO emissions, instabilities in the flame and extinguishing of the flame. Customary methods of combating these problems include an air bypass, a staged burner, the injection of steam or the use of diffusion pilot burners. However, this again leads to an increase in the nitrogen oxide emissions.

SUMMARY OF THE INVENTION

Accordingly, one object of the invention is, in the case of a method for operating a gas turbine group of the type mentioned at the start, is to provide a novel way of ensuring lean combustion with low emissions and to make it possible to have a stable flame at all times.

According to the invention, this is achieved by the features of the first claim.

The essence of the invention is thus that compressed air, fed via an air line element, is mixed with fuel fed via a fuel line element and delivered to a reactor having a catalytic coating, the air/fuel mixture is converted in the reactor into a synthesis gas essentially consisting of hydrogen, carbon monoxide, residual air and residual fuel and this synthesis gas is injected into the zones of the combustion chamber where the flame is stabilized.

The advantages of the invention consist, amongst other things, in that, because of the high reactivity of hydrogen, the flame of the lean premixing burner is stabilized much more efficiently than when using a customary pilot flame, that is to say the flame does not in this case move periodically, and pressure pulsations in the burner are therefore avoided. The hydrogen pilot flame results in higher local flame temperatures and, through its effect on the OH concentration, the local reaction rates are increased. The overall fuel requirement is then much less than in the case of conventional diffusion pilot flames. By virtue of the lower fuel consumption of the flame, the nitrogen oxide emissions are reduced, even when the gas turbine system is operated under partial load.

The deliberate local injection of the synthesis gas leads to a controllable deliberate combustion of the hydrogen. If the synthesis gas had been fed to the rest of the premixing burner fuel and mixed with it, problems would have arisen because of the high reactivity of hydrogen, that is to say the air/fuel mixing time would need to be reduced and the standard fuel injection would need to be changed in order to prevent flame-back.

Further advantageous refinements of the invention are given in the subclaims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein: the single FIGURE schematically represents an illustrative embodiment of the invention. Only those elements essential to understanding of the invention are shown.

DESCRIPTION OF THE PREFERRED EMBODIMENTS

Referring now to the drawing, in the FIGURE, a common stretch of shaft 4 connects a gas turbine, essentially consisting of a compressor 1, a combustion chamber 5 and a turbine 2 proper, to a generator 3. The common stretch of shaft 4 may in this case be formed by individual shafts which are connected via couplings (not represented in further detail).

In the compressor 1, the air taken in via an air inlet 20 is compressed, and the compressed air is delivered to the combustion chamber 5 via an air line 21. Fuel is delivered to the combustion chamber 5 via a fuel line 6. A premixer 18 for mixing fuel and compressed air is arranged in the combustion chamber. The air/fuel mixture obtained in this way is burned in a combustion space 19 of the combustion chamber 5. The hot gas which is produced is delivered via a hot gas line 22 to the turbine 2 where it is expanded and a part of the energy of the hot gas is converted into rotational energy. The still hot exhaust gases are discharged via an exhaust line 23.

A part of the compressed air is diverted from the air line 21 via an air line element 15. The amount of compressed air which is branched off can be adjusted by means of a valve 15V in the air line element 15 and by means of a valve 21V arranged after the branch in the air line 21. The air branched off via the air line element 15 is compressed further in an auxiliary compressor 7 and can be heated in a preheating system 8 by supplying heat energy 12. After this, the air is delivered to a mixer 9 where the air is mixed with a part of the fuel, in particular natural gas or methane. For this purpose, a fuel line element 16 branches off from the fuel line 6. Here again, the valves 16V and 6V are arranged after the branch in the fuel line element 16 and in the fuel line 6, in order to adjust the amount of fuel branched off. The fuel line element 16 likewise leads to the mixer 9 via a heat exchanger 11.

The air/fuel mixture having an excess of fuel ($\lambda<1$) is fed to a catalytic reactor 10 and partially oxidized therein. A typical oxidation process for a methane/air mixture is in this case:

$$2CH_4 + O_2 \rightarrow 4H_2 + 2CO \quad \Delta H = -35.6 \text{ kJ/mol } CH_4$$

The hydrogen/carbon monoxide/methane/residual air mixture obtained in this way, hereafter referred to as synthesis gas, is delivered to the combustion chamber 5, in particular to the combustion space 19, via a catalysis gas line 17 and via the heat exchanger 11, where the heat of reaction of the synthesis gas is given up to the incoming fuel.

In order to carry out the reaction, the reactor 10 contains a honeycombed ceramic body having a coating of a noble metal catalyst, for example based on the elements Rh, Pt, Ru or Ir. The ceramic body which supports the catalyst may also be made of different materials, and can have an arbitrary layout of channels. For example, U.S. Pat. No. 5,149,464 discloses a method for the selective oxidation of methane to form hydrogen and carbon monoxide. The methane/air mixture is for this purpose heated to at least 600° C. and brought into contact with a catalyst made of the alloy $M_xM'_yO_z$, M being at least one element of the elements Mg, B, Al, La, Ga, Si, Ti, Zr and Hf and M' being a transition metal from the d series.

The equilibrium conversion of methane as well as the product selectivity for CO and $H_2$ increases with the reaction temperature, i.e. the higher the temperature is, the more methane is converted and the more CO and $H_2$ are produced. The reaction temperature should be between 550 to 850° C., preferably between 700 and 800° C.

A lower reaction pressure of less than or equal to 20 bar favors the conversion selectivity for hydrogen. Further, a low pressure reduces the risk of an explosion in the reactor 10. On the other hand, fuel at a high pressure, which can be set using the auxiliary compressor, is needed for injection into the combustion chamber 5 in order to ensure a sufficient penetration depth and degree of mixing of the fuel in the burner.

The stoichiometric ratio for the reaction is at $\lambda=0.5$. A smaller $\lambda$ ratio may possibly be desirable at higher reaction pressures, in order to reduce the risk of an explosion, since the residual oxygen is thereby prevented, and in order to improve the reaction selectivity. A higher methane/air ratio reduces the reaction temperature through the additional dilution of the products.

The throughput rate through the reactor needs to be selected so that a maximal yield can be achieved. The selectivity for forming the intermediate reaction products CO and $H_2$, i.e. preventing further reaction with the residual $O_2$ in the air to form $CO_2$ and $H_2O$, can be improved by increasing the throughput rate through the catalyst of the reactor 10. It is therefore advantageous to operate with the highest possible throughput rates, which ensure almost complete conversion, so that the retention time inside the catalyst is at most 1 ms. It is also advantageous to operate using catalysts which have the narrowest possible dwell time spectrum.

The synthesis gas which is obtained is injected into the regions of the premixer where the flame is stabilized. This can be done using a premixing burner, as for example disclosed by DE 43 04 213, which consists of two conical shell elements which are offset relative to one another. A series of nozzles, via which the gas mixture can be injected, is arranged at the downstream end of the burner, at the junction with the combustion space. Since, in the case of this burner, the flame is essentially stabilized by a cross-sectional discontinuity at the downstream end of the burner, the injection apertures may also be arranged on the front plate, essentially circumferentially around the outlet of the burner. However, what is essential for implementation of the invention is not the embodiment of the premixer but the fact that the injection apertures for the highly reactive synthesis gas are arranged where the flame is to be stabilized.

A flame or flames formed by synthesis gas then form a stable combustion zone and also an ignition source for the burner, that is to say they serve as pilot flames.

In order to initiate the synthesis gas reaction, the reactor 10 needs to be preheated to more than 500° C. This can be achieved either by preheating the compressed air using the preheating system 8 or by directly heating the catalyst in the reactor 10, in which case the preheating system 8 is no longer required. In this case, heating the catalyst directly, electrically by applying a current to the metal of the catalyst or to a metallic honeycombed body, or chemically, for example by $H_2$ oxidation using an additional hydrogen injection system 24 and mixing downstream of the catalyst, then requires much less energy. Once the exothermal reaction has been initiated, it should continue without any further energy being added. Further, the heat of reaction of the synthesis gas can be given up via the heat exchanger 11 to the incoming fuel.

The invention is not, of course, restricted to the illustrative embodiment which has been presented and described. The synthesis gas may be produced centrally or locally, central production being more economical. The air line element 15 and the fuel line element 16 do not need to branch off from the air line 21 and the fuel line 6, but may alternatively be fed separately.

The synthesis gas can also be obtained by means of steam reforming.

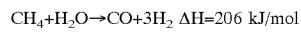

The steam reforming process may in this case also be operated autothermally.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the Unites States is:

1. A method for operating a gas turbine group, the gas turbine group essentially consisting of a compressor (1), a combustion chamber (5), a turbine (2) and a generator (3), fuel being mixed in a premixer (18) of the combustion chamber (5), prior to the combustion, with air compressed in the compressor (1), and subsequently being burned in a combustion space (19), wherein compressed air, fed via an air line element (15), is mixed with fuel fed via a fuel line element (16) and delivered to a reactor (10) having a catalytic coating, the air/fuel mixture is converted in the reactor (10) into a synthesis gas comprising hydrogen, carbon monoxide, residual air and residual fuel and this synthesis gas is injected into the zones of the combustion chamber (5) where the flame is stabilized.

2. The method as claimed in claim 1, wherein the fuel fed via a fuel line element (16) is natural gas and/or methane.

3. The method as claimed in claim 1, wherein the air line element (15) branches off from an air line (21) which delivers the compressed air from the compressor (1) to the combustion chamber (5) and/or the fuel line element (16) branches off from a fuel line (6) which feeds the fuel to the combustion chamber (5).

4. The method as claimed in claim 1, wherein the fuel fed to the reactor (10) is preheated in a heat exchanger (11) before being mixed with the compressed air.

5. The method as claimed in claim 4, wherein the heat energy of the synthesis gas is used to heat the fuel in the heat exchanger (11).

6. The method as claimed in claim 1, wherein, when the synthesis gas production is started, the compressed air is heated prior to being delivered to the reactor (10) and/or the catalyst is heated.

7. The method as claimed in claim 6, wherein the catalyst is heated electrically and/or chemically.

8. The method as claimed in claim 1, wherein the compressed air fed to the reactor (10) via the air line element (15) is compressed using an auxiliary compressor (7).

9. The method as claimed in claim 1, wherein the synthesis gas is injected into the combustion space (19) of the combustion chamber (5).

* * * * *